(12) United States Patent
Wertheimer

(10) Patent No.: US 7,835,299 B2
(45) Date of Patent: Nov. 16, 2010

(54) METHOD AND SYSTEM FOR POWER CONSUMPTION REDUCTION BY NETWORK DEVICES AS A FUNCTION OF NETWORK ACTIVITY

(75) Inventor: Aviad Wertheimer, Zur-Hadassah (IL)

(73) Assignee: Intel Corporation, Santa Clara, CA (US)

( * ) Notice: Subject to any disclaimer, the term of this patent is extended or adjusted under 35 U.S.C. 154(b) by 506 days.

(21) Appl. No.: 11/902,660

(22) Filed: Sep. 24, 2007

(65) Prior Publication Data

US 2009/0080433 A1 Mar. 26, 2009

(51) Int. Cl.
*H04L 12/26* (2006.01)
*H04L 12/28* (2006.01)
*H04B 7/185* (2006.01)

(52) U.S. Cl. .................. 370/252; 370/318; 370/401
(58) Field of Classification Search ................. 370/252, 370/254, 255, 311, 318, 392, 401
See application file for complete search history.

(56) References Cited

U.S. PATENT DOCUMENTS

| | | | | |
|---|---|---|---|---|
| 5,808,881 A | * | 9/1998 | Lee | 363/37 |
| 6,122,745 A | * | 9/2000 | Wong-Insley | 713/300 |
| 6,691,234 B1 | * | 2/2004 | Huff | 713/300 |
| 7,093,146 B2 | * | 8/2006 | Riley | 713/310 |
| 7,385,982 B2 | * | 6/2008 | Warden et al. | 370/392 |
| 7,551,568 B2 | * | 6/2009 | Jeong et al. | 370/252 |
| 2004/0025063 A1 | * | 2/2004 | Riley | 713/300 |
| 2005/0288893 A1 | * | 12/2005 | Gassner | 702/182 |
| 2006/0209725 A1 | * | 9/2006 | Cadambi et al. | 370/255 |

* cited by examiner

*Primary Examiner*—Hong Cho
(74) *Attorney, Agent, or Firm*—Pearl Cohen Zedek Latzer, LLP

(57) ABSTRACT

A method and system may provide power consumption reduction by a network device. A device on a network and its components each may capable of operating in a low-power state and a high power state. The device may include a host to run an application and a network controller to interface with the network. The network controller may include a host interface logic to interface with host, a micro-engine or other logic to process network maintenance data packets, and a filter to classify data packets. The filter may classify a received data packet having an associated data type and an associated destination by data type and destination. The data packet may be sent to the micro-engine if the data type and destination of the packet may be processed by the micro-engine.

15 Claims, 2 Drawing Sheets

METHOD AND SYSTEM FOR POWER CONSUMPTION REDUCTION BY NETWORK DEVICES AS A FUNCTION OF NETWORK ACTIVITY

BACKGROUND OF THE INVENTION

Network devices may not operate at a constant utilization level. In current network devices, power consumption may not reduce gradually as a function of network utilization or activity level. Some network devices may operate for example in accordance with the Advanced Configuration and Power Interface (ACPI) specification which specifies various power management features. These devices may have two or more pre-defined operating states that may be defined by or may define power consumption such as for example ACPI D0 (e.g., an active state) and ACPI D3 (e.g. a low power state). During periods of high activity a device may operate in for example a D0 state, while a device may operate in for example a D3 state and consume less power when idle or during minimal activity.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
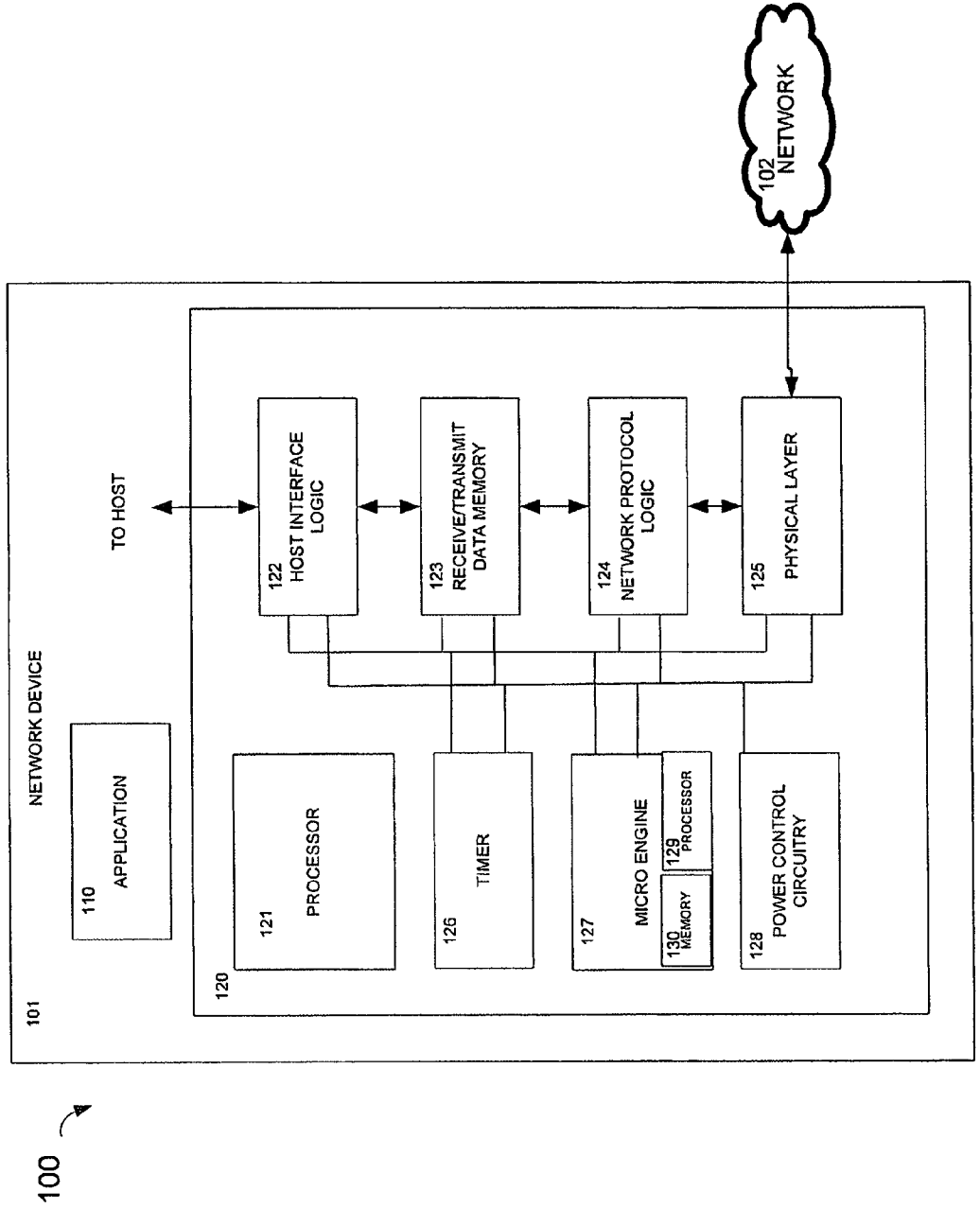
FIG. 1 is a schematic illustration of a network device according to an embodiment of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer, processor, or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the present invention may be used in a variety of applications. Although the present invention is not limited in this respect, the circuits and techniques disclosed herein may be used in many apparatuses such as personal computers, network equipment, stations of a radio system, wireless communication system, digital communication system, satellite communication system, and the like.

Stations, nodes and other devices intended to be included within the scope of the present invention include, by way of example only, local area network (LAN) stations and/or nodes, metropolitan area network (MAN) stations and/or nodes, personal computers, peripheral devices, wireless LAN stations, and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a personal area network (PAN), LAN, wide area network (WAN), or a global communication network, for example, the Internet.

Embodiments of the invention may provide a method and system for reduction of power consumption by network devices as a function of network activity. In one embodiment, a device on a network and its components or sub-devices, which may include a network controller, may be capable of operating in a low-power state and an active state. A filter of a network controller, may classify a received data packet having an associated data type and an associated destination. The network controller may be a sub-device of the network device and may also include a host to run an application. The network controller may interface with a network and may include the filter; host interface logic to interface with the host; and packet processing logic such as a micro-engine to process network maintenance packets. As used herein, network maintenance packets may be for example packets to which the micro-engine or other appropriate logic may respond without reference to, or without communicating with, a host or network device or application. Network maintenance packets include but are not limited to network management traffic, traffic related to the administration of the network the device communicates with, traffic not targeted to a specific user or application on the network device, keep alive packets, and/or address resolution protocol packets. The received data packet may be sent to the micro-engine if the data type of the packet may be processed by the micro-engine.

Reference is now made to FIG. 1, a schematic illustration of a system according to an embodiment of the invention. System 100 may include network device 101 capable of for example reducing its power consumption and a network 102 according to an embodiment of the invention. Although the invention is not limited in this respect, network device 101 may include or may be, for example, a personal computer, a desktop computer, a mobile computer, a laptop computer, a notebook computer, a terminal, a workstation, a server computer, a personal digital assistant (PDA) device, a network device, node, switch, router, or other suitable computing device capable of receiving and/or transmitting data on a network such as for example network 102. In some embodiments, network device 101 may host, execute or run one or more applications that may require communications over network 102.

Network 102 may be any suitable network such as for example a LAN, MAN, wireless LAN, or other wired or wireless network as known in the art capable of data communications.

Network device 101 may include an application 110 and a network controller 120 for communicating or serving as a communications interface with a network external to network device 101 such as for example network 102. Network device 101, its components or sub-devices, and their respective components each may be capable of operating in a low-power state and an active or high power state. In some embodiments, the power state of each of these components may be changed as a function of for example activity level, e.g., a component may operate in the low-power state during periods of inactivity and in the active state when active, e.g., processing data traffic.

Application 110 may be a hardware component, a circuit, or software application (e.g., executed in network device 101 by for example a processor) or combination thereof that may require communications over network 102. Network controller 120 may process data received from network 102 and, depending on the type of data received, pass or forward data received from network 102 to network device 101, application 110 hosted on network device 101, or another component of network device 101. Network controller 120 may also send data from network device 101 to network 102. In some embodiments, network controller 120 may operate as a physical layer (e.g., OSI layer 1) and a data layer (e.g., OSI layer 2) component providing a physical access networking medium and low-level addressing such as for example through media access control (MAC) addresses, although the invention is not limited in this respect. Network controller 120 may be implemented as a software application executed in a component of or in network device 101 or as a hardware component integrated within network device 101 or as a hardware component of some other hardware component of network device 101. Network controller 120 may be implemented using for example a network interface card, a transceiver, a separate transmitter and receiver, or one or more units able to perform separate or integrated functions of transmitting and/or receiving wire or wireless communication signals, blocks, frames, transmission streams, packets, messages and/or data. In some embodiments, network controller 120 may utilize MAC addressing in accordance with one or more IEEE standards. Other addressing schemes may also be used.

In some embodiments, network controller 120 may include a processor 121, host interface logic 122, receive/transmit data memory 123, network protocol logic 124, a physical layer (PHY) 125, timer 126, a micro-engine 127, which may include for example circuitry or logic such as packet-processing logic, and power control circuitry 128. Some or all of these components may be able to operate in two or more power states such as for example high or low power. In some embodiments, network controller 120 and or its components may operate in accordance with the ACPI specification which specifies various power management features and operating states with respect to power consumption, or in accordance with another power saving specification.

Additionally, in some embodiments network controller 120 and possibly network device 101 may operate with a wake on LAN (WoL) capability in which network controller 120 may be in a low power state such as ACPI D3 or higher and be activated or woken up by a particular data packet arriving at network controller 120. Some embodiments may further include one or more low-power devices that may remain active for example to listen for packets arriving at network controller 120.

When data enters network controller 120 from network 102, it may enter via for example PHY 125. It may then be processed by network protocol logic 124 and stored in receive/transmit data memory 123 before being transferred on to network device 101 via host interface logic 122. For data from network device 101 that is destined for network 102, data may be passed through these components in the reversed sequence.

In some embodiments, certain components of network controller 120 and/or network device 101 may be placed in a low power state, a reduced power state, or an off state during periods of inactivity. Network controller 120 may be place in a low power state for example when no WoL capability is required. By filtering certain incoming data packets by data type and processing them in a sub-component or sub-device such as a micro-engine 127, the low power state of other components such as host interface logic 122 and/or receive/transmit data memory 123 may be extended or entered earlier, or other components need not be taken out of a low-power state or woken up unnecessarily. Processor 121 may be or include for example a central processing unit (CPU), a digital signal processor (DSP), a microprocessor, a controller, a chip, a microchip, or any suitable multi-purpose or specific processor or controller. In some embodiments, for example, processor 121 may perform calculation operations or processing operations, which may be used in various transmit, receive, or other operations of network controller 120.

Network controller 120 may pass data to and from network device 101 via for example host interface logic 122. In some embodiments, host interface logic 122 may be or include a bus interface unit or direct memory access (DMA) block or other device known in the art for reading and writing data in a host, e.g. network device 101. For transferring data to network device 101, host interface logic 122 may obtain data from for example receive/transmit data memory 123 or other data storage location in network controller 120.

Receive/transmit data memory 123 may include, for example, one or more memories such as a random access memory (RAM), a read only memory (ROM), a dynamic RAM (DRAM), a synchronous DRAM (SD-RAM), a Flash memory, a volatile memory, a non-volatile memory, a cache memory, a buffer, a short term memory unit, a long term memory unit, or other suitable memory units for intermediate storage of data. In some embodiments, data stored in receive/transmit data memory 123 may be forwarded to network device 101 immediately, after some specified delay or elapsed time, or when some other threshold of memory utilization or data storage is reached.

Network protocol logic 124 may include media access control (MAC) layer addressing and packet filtering logic, e.g., a filter, for passing data between PHY layer 125 and network device 101. Packet filtering logic may be implemented in software algorithms or in hardware using logic circuitry as known in the art. In some embodiments, the packet filtering logic (filters) of network protocol logic 124 may be configured to accept packets destined for a specific node such as for example network device 101. These filters may also be configured to pass certain traffic types of data packets to for example a specific application or host on network device 101 or to micro-engine 127 or to both according to the data type or classification.

In some embodiments, filtering algorithms of network protocol logic 124 may classify or categorize data in for example, categories such as application or other data destined for the host, e.g. network device 101; network traffic destined for the host; network traffic for micro-engine 127; and data intended for a destination outside of network device 101; or other suitable categories. In some embodiments, other suitable categories may include other those related to components of network controller 120 such as for example a management controller and/or other sub-devices of network device 101 connected to network controller 120 such as for example a Base Board Management Controller.

Application data destined for the host may further be categorized as requiring immediate forwarding, e.g. urgent or that can be delayed, e.g. non-urgent. Urgent data may include for example data packets for a video streaming application transmitting in real time or other data. Network controller 120 may forward urgent data immediately to network device 101 via host interface logic 122. If required, any components of network controller 120 necessary for processing urgent data that are in a low power state may be powered up or changed to a different power state, e.g., high power state, to process the urgent data. Network controller 120 may store packets that can be delayed in for example receive/transmit data memory 123 prior to forwarding them to network device 101. Non-urgent packets may include for example file access traffic packets such as for example for a word processing file or application. Packets of this type may be stored until a predefined criterion such as a memory threshold or elapsed time is met. When the criterion is reached, the appropriate components of network controller 120 that are in a low power state may be powered up to forward the data to network device 101.

Network traffic destined for the host may also be categorized or given a priority such as for example urgent and non-urgent; other categorizations may be used. An example of urgent network traffic destined for the host may be a network/system synchronizing packet or other timing traffic, while an example of non-urgent traffic destined for the host may include a TCP/IP receive packet for establishing a network connection. Network controller 120 may handle this traffic in the same manner as application data, e.g., immediately forwarding urgent data while storing non-urgent data until a pre-defined criterion met.

Network traffic that may processed by micro-engine 127 may be traffic such as network management traffic, traffic related to how network device 101 communicates with or relates to network 102 or other network devices on network 102, or traffic not targeted to a specific user or application on the host, e.g. application 110 on network device 101, and for which micro-engine 127 itself may determine the appropriate action such as sending a reply, and execute the action without host intervention and/or without additional resources and may include for example network maintenance traffic such as for example keep alive packets or address resolution protocol (ARP) packets or other traffic to which micro-engine 127 may respond without reference to, or without communicating with, the host, e.g., network device 101 or application 110. Network traffic that may be processed by micro-engine 127 may include in some embodiments traffic for which knowledge (e.g., data contained in a database, a memory, a register, etc.) is contained within the micro-engine 127, or within a structure separate from the host that may be powered on without powering on the host.

Timer 126 may be any timing circuitry or software for producing timing or reference time signals used by some or all of the components of network controller 120 as known in the art. In some embodiments, timer 126 may be used a reference timing signal for determining the time elapsed since data was placed in receive/transmit memory 123 and/or for determining when one or more components of network controller 120 may be switched to a low power state.

Micro-engine 127 may be a sub-component or sub-device of network controller 120 and may be or include circuitry or logic such as packet processing logic, a programmable core, a processor 129 other than processor 121, CPU, controller, hardwired random logic, programmable random logic, or other circuit or software application capable of responding without host intervention or additional resources to a limited set of network data received from network 102 for which there may a pre-determined or known response stored in micro-engine 127. These received data may be for example an address query, status update, or other network maintenance traffic query or request as known in the art. Micro-engine 127 may include a memory unit 130 for storing responses or data relevant to generating a known response to the received data. It is an advantage of the some embodiments of the invention that by using micro-engine 127 to process this type of network traffic instead of passing this traffic to network device 101, some components of network controller 120 or network device 101 may spend more time in a low power state thereby reducing overall device and system power consumption.

Power control circuitry 128 may be a set of circuits or components that control or regulate the power state of some or all of the components of network controller 120. Alternatively, in some embodiments, the functions of power control circuitry 128 may be incorporated directly into the some or all of the components of network controller 120. Power control circuitry 128 may configure or operate and regulate the power state of network controller 120 in accordance with a known standard such as for example the ACPI standard and may vary component power modes or states between for example ACPI D0, an active state, and ACPI D3, a low power state. A component of network controller 120 may be powered down when it is not engaged or involved in processing any data traffic. Power control circuitry 128 may reduce the power state of a component based on an elapsed time threshold since a component was active. In some embodiments, different components may have different thresholds and may have power reduced at different elapsed times after activity. A component of network controller 120 may be powered up when its participation is required for data processing as determined by the data traffic's classification. Furthermore, although not shown, in some embodiments network device 101 may have additional components for controlling the power state of for example application 110 which may work in conjunction with power control circuitry 128.

In some embodiments, network protocol logic 124 and PHY 125 may only be set to a low power state by for example power control circuitry 128 when network controller 120 itself may be in a low power state, there may be no access to network 102 such as for example when a cable may be disconnected or a network partner may be inactive, or possibly when there is no data traffic on network 102.

In some embodiments, PHY 125 may include a link activity detection circuit (not shown). The link activity detection circuit may remain on while PHY 125 and network protocol logic 124 are operating in a low-power state. When the link activity detection circuit detects a connection to network 102 or activity on network 102, the link activity detection circuit may activate or wake the components of PHY 125 and network protocol logic 124 that are operating in the low-power state.

In some embodiments, if there is no activity on network controller 120 for a predetermined period or if any traffic received at network controller 120 may be processed by micro-engine 127, then power control circuitry 128 may set or configure one or more components of network controller 120 such as e.g. host interface logic 122 to a low power state. In one embodiment, host interface logic 122 may remain in a low power state until one or more of the following occurs:

network controller 120 receives data traffic destined for the host that can not be processed by micro-engine 127 and is urgent; an elapsed time limit is reached for non-urgent data traffic destined for the host and stored in receive/transmit data memory 123; network controller 120 receives additional non-urgent traffic destined for the host that when added to currently stored non-urgent traffic exceeds a memory utilization threshold of receive/transmit memory 123; or other criteria. At that point, power control circuitry 128 may set the power state of host interface logic back to an active power state. Other power state transitions, based on other criteria, may be used.

In some embodiments, if traffic received by network controller 120 is processed by micro-engine 127 and micro-engine 127 is operating in the low power state, power control circuitry 128 sets the power state of micro-engine 127 to the high power state before sending the received data packet or packets to micro-engine 127. Further, power control circuitry 128 may set the power state of micro-engine 127 to the low power state if an elapsed time since any data packet was last received at micro-engine 127 exceeds a predetermined elapsed time value.

Figure 2:
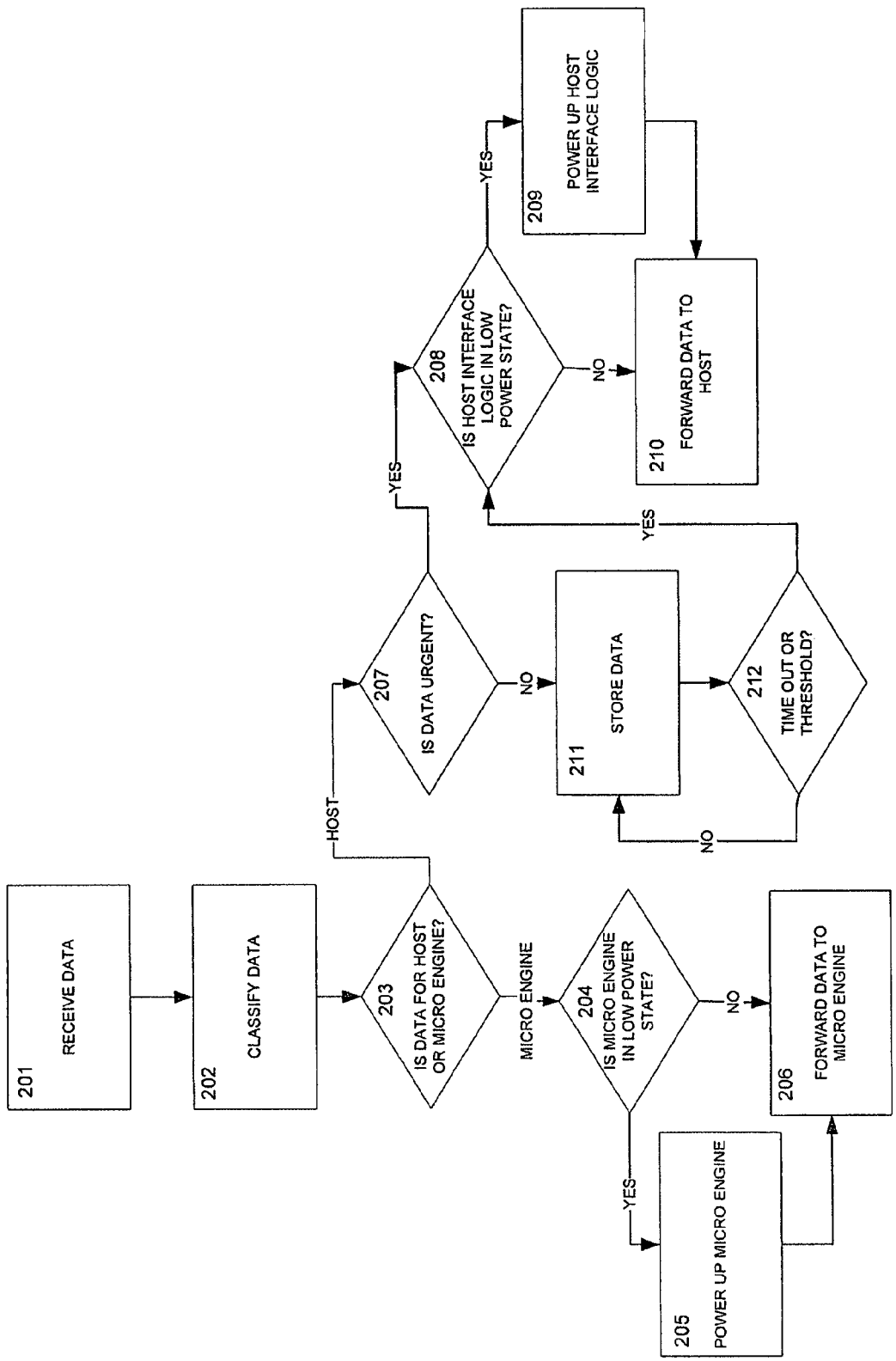
FIG. 2 is a flowchart of a method for data handling according to an embodiment of the invention.

Reference is now made to FIG. 2 which is a flowchart of a method for data handling according to an embodiment of the invention. Embodiments of the method may be used by, or may be implemented by, for example, network controller 120 of FIG. 1 or by other suitable components of network devices, stations, nodes, systems or network entities. By employing the method of FIG. 2, network controller 120 may route certain data through micro-engine 127 thereby reducing the activity level of some other components of network controller 120 and/or network device 101. The lower activity level may enable power control circuitry such as for example power control circuitry 128 to maintain those components in a low power state for longer periods of time than by current methods.

In operation 201, a data packet may be received from a network such as network 102 by a network device such as for example network device 101 having a network controller such as for example network controller 120. When received at network controller 120, the data packet may pass through a physical layer such as PHY 125 to filtering logic such as network protocol logic 124.

In operation 202, network protocol logic 124 may classify the data packets according to for example classifications discussed herein. Data packet destination information may be contained for example in a packet header in the form of for example a MAC address, TCP/IP port number, IP address or other such routing or destination protocol as known in the art. Alternatively, data packets may use other destination formats and protocols—network protocol logic 124 may be configured to classify data packets using these alternative protocols as well.

In operation 203, network protocol logic 124 may determine whether the data packet should be processed by the host, e.g. network device 101, or another component such as micro-engine 127. Data packets which may be processed by micro-engine 127 may include for example network maintenance data packets for which micro-engine 127 may respond without reference to network device 101 or application 110. Although not shown, data packets not destined for network device 101 may be ignored or passed back onto the network.

If a data packet may be processed by micro-engine 127, a component of network controller 120 such as for example power control circuitry 128 may determine if micro-engine 127 is in a low power state (operation 204). If micro-engine 127 is in a low power state, power control circuitry 128 may activate or power up micro-engine 127 (operation 205). If micro-engine 127 was already activated or has been activated as a result of operation 205, then data packets which may be processed by micro-engine 127 may be forwarded directly to micro-engine 127 (operation 206). Forwarding packets to micro-engine 127 may preserve a lower power operating state for other components of network controller 120 and/or network device 101 or may allow them to enter a lower power operating state earlier based on a timing threshold for power reduction because they are not engaged in data processing when micro-engine 127 handles data.

In operation 207, network protocol logic 124 may further determine whether a data packet destined for the host is urgent or can be delayed. If the data packet is urgent, network controller 120 may forward the data packet to the host via for example host interface logic 122. Network controller 120 may first determine if host interface logic 122 and, in some embodiments, other components of network controller 120 required to forward data to the host as well other components of network device 101 such as application 110 are in a low power state (operation 208). Components such as host interface logic 122 or application 110 may be in a low power state because they have been idle, e.g., they have not processed any data traffic for some time. Power control circuitry 128 and or other components not shown may have lowered operating power earlier to reduce power consumption.

Components of network controller 120 and/or network device 101 that are in a low power state may be woken up or activated in operation 209. If these components are already in an active state for operation 208 or if operation 209 is complete, urgent data packets may be forwarded to the host in operation 210.

A data packet that is destined for the host and can be delayed may be stored for example in receive/transmit memory 123 or other suitable memory unit or buffer (operation 211). The data packet may remain in receive/transmit memory 123 until some criterion such as for example a predetermined elapsed time since a first data packet was stored or until the receive/transmit memory 123 is at a predetermined capacity level (operation 212). At that point, the method may proceed with operations 208-210 for forwarding the data to the host. Alternatively, the host or network device 101 may request the data directly (not shown).

Although the operations of FIG. 2 may be implemented by a network controller such as network controller 120, it is to be understood that these operations may be combined into a different set of operations. Other operations may also be used. For example, determining operations 203 and 207 may be accomplished differently: network protocol logic 124 may first determine if a packet is urgent and then determine its destination.

Alternatively, packets may be sorted initially by network versus application type and placed into separate buffers of receive/transmit memory 123.

Additional receive data classification types may be defined to enable powering down or maintaining the low power state of different components of network controller 120 or network device 101. Micro-engine 127 may be capable handling received data of such classifications without host intervention or additional resources.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes as fall within the true spirit of the invention.

The invention claimed is:

1. A method comprising:
   in a device on a network, the device comprising a set of subcomponents, the device, its components and respective subcomponents each capable of operating in an active power state and a low power state, wherein the device comprises a host to run an application and a network controller to interface with the network, the network controller comprising a host interface logic to interface with the host, a packet processing logic to process network maintenance data packets, and a filter to classify data packets, classifying in the filter a received data packet having an associated destination by destination; and
   if the packet may be processed by the packet processing logic and the packet is a network maintenance packet, sending the received data packet to the packet processing logic;
   if the destination of the packet is the host and the host interface is operating in the low power state, configuring the host interface logic to operate in the active power state; and
   if the packet destination is the host, sending the data packet from the filter to the host interface logic.

2. The method of claim 1, comprising configuring the host interface logic to operate in the low power state when a time elapsed since any data packet was last received at the host interface logic exceeds a first predetermined elapsed time value.

3. The method of claim 2, comprising storing the data packet in a memory of the network controller if the packet destination is the host and the packet is non-urgent.

4. The method of claim 3, comprising:
   sending from the memory one or more data packets stored therein to the host interface logic when a time elapsed since a first data packet of the one or more stored data packets was stored exceeds a second predetermined elapsed time value.

5. The method of claim 3, comprising:
   sending from the memory one or more data packets stored therein to the host if a threshold level of stored data packets is exceeded.

6. The method of claim 1, comprising when the packet processing logic is operating in the low power state configuring the packet processing logic to operate in the active power state before said sending.

7. The method of claim 1, comprising configuring the packet processing logic to operate in the low power state when the packet processing logic is operating in the active power state and a time elapsed since any data packet was last received at the packet processing logic exceeds a predetermined elapsed time value.

8. The method of claim 1, wherein the data packets comprise data packets to which the packet processing logic can respond without reference to the host.

9. A device comprising:
   a host to run an application; and
   a network controller to interface with a network, the network controller comprising:
      a host interface logic to interface with the host;
      a packet processing logic to process network maintenance data packets;
      a filter to classify a received data packet having an associated destination, to send the received data packet to the packet processing logic if the packet may be processed by the packet processing logic and the packet is a network maintenance packet, and to send the received data packet to the host interface logic if the packet destination is the host; and
      a power control circuitry to configure a power state of the host interface logic, the packet processing logic, and the filter between a low-power state and an active power state; and if the packet destination is the host and the host interface logic is operating in the low-power state, to configure the power state of the host interface logic to operate in the active power state.

10. The device of claim 9, wherein:
    the power control circuitry configures the host interface logic to operate in the low power state when a time elapsed since any data packet was last received at the host interface logic exceeds a first predetermined elapsed time value.

11. The device of claim 9, wherein the network controller comprises:
    a memory to store the data packet if the packet destination is the host and the packet is non-urgent.

12. The device of claim 11, wherein:
    the memory sends one or more data packets stored in the memory to the host interface logic when a time elapsed since a first data packet of the one or more stored data packets was stored exceeds a second predetermined elapsed time value.

13. The device of claim 11, wherein:
    the memory sends one or more data packets stored in the memory to the host if a threshold level of stored data packets is exceeded.

14. The device of claim 9, wherein:
    the power control circuitry configures the packet processing logic to operate in the active power state before said sending when the packet processing logic is operating in the low power state.

15. The device of claim 9, wherein:
    the power control circuitry configures the packet processing logic to operate in the low power state when the packet processing logic is operating in the active power state and a time elapsed since any data packet was last received at the packet processing logic exceeds a predetermined elapsed time value.

* * * * *